United States Patent
Cheng et al.

(10) Patent No.: US 10,592,698 B2
(45) Date of Patent: Mar. 17, 2020

(54) ANALOG-BASED MULTIPLE-BIT CHIP SECURITY

(71) Applicant: International Business Machines Corporation, Armonk, NY (US)

(72) Inventors: Kangguo Cheng, Schenectady, NY (US); Xin Miao, Guilderland, NY (US); Wenyu Xu, Albany, NY (US); Chen Zhang, Guilderland, NY (US)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 15/446,211

(22) Filed: Mar. 1, 2017

(65) Prior Publication Data

US 2018/0253568 A1    Sep. 6, 2018

(51) Int. Cl.
| | |
|---|---|
| *H01L 23/00* | (2006.01) |
| *G06F 21/73* | (2013.01) |
| *H01L 29/06* | (2006.01) |
| *H01L 21/8234* | (2006.01) |
| *H01L 27/088* | (2006.01) |
| *H01L 29/78* | (2006.01) |
| *H01L 21/66* | (2006.01) |

(52) U.S. Cl.
CPC ............ *G06F 21/73* (2013.01); *H01L 23/576* (2013.01); *H01L 29/0673* (2013.01); *H01L 29/0676* (2013.01); *H01L 21/823412* (2013.01); *H01L 22/14* (2013.01); *H01L 27/088* (2013.01); *H01L 29/785* (2013.01)

(58) Field of Classification Search
CPC ... G06F 21/73; H01L 29/0673; H01L 29/785; H01L 29/0676; H01L 23/576; H01L 22/14; H01L 21/823412; H01L 27/088
See application file for complete search history.

(56) References Cited

U.S. PATENT DOCUMENTS

| | | | | |
|---|---|---|---|---|
| 6,629,245 B1 * | 9/2003 | Stone | ................. | G07C 9/00007 235/375 |
| 7,613,756 B1 * | 11/2009 | Zhu | ......................... | G06F 7/588 708/250 |
| 8,134,197 B2 | 3/2012 | Forbes | | |

(Continued)

OTHER PUBLICATIONS

G.E. Suh et al., "Physical Unclonable Functions for Device Authentication and Secret Key Generation," Proceedings of the 44th Annual Design Automation Conference (DAC), Jun. 2007, 6 pages.

(Continued)

*Primary Examiner* — Khoi V Le
(74) *Attorney, Agent, or Firm* — Vazken Alexanian; Ryan, Mason & Lewis, LLP

(57) ABSTRACT

A semiconductor device includes a plurality of transistors on a substrate, each transistor of the plurality of transistors including a doped nanowire channel region, where the plurality of transistors are grouped into a plurality of transistor groups each including two transistors of the plurality of transistors, and where each transistor group is assigned a state based on an electrical characteristic of each transistor in each transistor group. The semiconductor device also includes a security code for the plurality of transistors generated by grouping together the states corresponding to each transistor group.

20 Claims, 4 Drawing Sheets

(56) References Cited

U.S. PATENT DOCUMENTS

| | | | |
|---|---|---|---|
| 8,803,328 B1 | 8/2014 | Song et al. | |
| 8,877,619 B1* | 11/2014 | Thompson | H01L 21/823412 |
| | | | 438/308 |
| 9,038,133 B2* | 5/2015 | Chellappa | G06F 21/44 |
| | | | 726/2 |
| 9,166,588 B2 | 10/2015 | Feng et al. | |
| 9,299,801 B1* | 3/2016 | Bakhishev | H01L 29/105 |
| 2002/0112174 A1* | 8/2002 | Yager | G06F 21/34 |
| | | | 726/2 |
| 2009/0100392 A1* | 4/2009 | Ivaldi | G03B 27/52 |
| | | | 716/106 |
| 2010/0181827 A1* | 7/2010 | Cunningham | B60L 3/04 |
| | | | 307/9.1 |
| 2010/0187527 A1* | 7/2010 | Van Geloven | H01L 23/576 |
| | | | 257/48 |
| 2011/0074498 A1* | 3/2011 | Thompson | H01L 21/823412 |
| | | | 327/543 |
| 2012/0168506 A1 | 7/2012 | Ruehrmair et al. | |

OTHER PUBLICATIONS

S. Bhunia et al., "Hardware Trojan Attacks: Threat Analysis and Countermeasures," Proceedings of the IEEE, Aug. 2014, pp. 1229-1247, vol. 102, No. 8.

J.W. Lee et al., "A Technique to Build a Secret Key in Integrated Circuits for Identification and Authentication Applications," Symposium on VLSI Circuits, Digest of Technical Papers, Jul. 2004, 6 pages.

Wayne Burleson, "Statistical Design Issues and Tradeoffs in On-Chip Interconnects," http://www.mpsoc-forum.org/2006/slides/Burleson.pdf, Aug. 2006, 75 pages.

\* cited by examiner

A-A

B-B

ANALOG-BASED MULTIPLE-BIT CHIP SECURITY

TECHNICAL FIELD

The field generally relates to semiconductor devices and methods of manufacturing same and, in particular, to providing on-chip hardware-based security from codes generated by quantized dopants.

BACKGROUND

Integrated circuits (ICs) including, for example, a System on a Chip (SoC), can include, for example, a large number (e.g., millions, billions) of transistors on a chip. These transistors may differ in structure or use, having different operational characteristics.

Chips have become increasingly vulnerable to compromise, tampering and/or counterfeiting from unauthorized third parties. For example, Bhunia, Swamp et al., "Hardware Trojan Attacks: Threat Analysis and Countermeasures," Proceedings of the IEEE, Vol. 102, No. 8, August 2014, states that "hardware Trojan attacks . . . in the form of malicious modifications of electronic hardware at different stages of its life cycle, pose major security concerns in the electronics industry. An adversary can mount such an attack with an objective to cause operational failure or to leak secret information from inside a chip." As a result, chip security has become increasingly important. As noted in Suh, G. Edward, et al., "Physical Unclonable Functions for Device Authentication and Secret Key Generation," Proceedings of the 44th annual Design Automation Conference, A C M, 2007, attempts to provide chip security include the use of physical unclonable functions (PUFs), which are "circuit primitives that extract secrets from physical characteristics of integrated circuits (ICs) . . . [and] exploit inherent delay characteristics of wires and transistors that differ from chip to chip."

However, known methods of providing chip security, including software-based security, are prone to malicious attack, and are difficult to implement. Accordingly, more secure alternative methods for providing chip security that are easier to implement are needed.

SUMMARY

According to an exemplary embodiment of the present invention, a method for manufacturing a semiconductor device includes forming a plurality of transistors on a substrate, each transistor of the plurality of transistors including a channel region, doping the channel region of each transistor of the plurality of transistors, grouping the plurality of transistors into a plurality of transistor groups of more than one transistor, measuring a threshold voltage of each transistor of each transistor group, determining a state for each transistor group based on the measured threshold voltage of each transistor in each transistor group, and generating a security code for the plurality of transistors by grouping together the states corresponding to each transistor group.

According to an exemplary embodiment of the present invention, a semiconductor device includes a plurality of transistors on a substrate, each transistor of the plurality of transistors including a doped channel region, where the plurality of transistors are grouped into a plurality of transistor groups of more than one transistor, and where each transistor group is assigned a state based on a threshold voltage of each transistor in each transistor group. The semiconductor device includes a security code for the plurality of transistors generated by grouping together the states corresponding to each transistor group.

According to an exemplary embodiment of the present invention, a method for manufacturing a semiconductor device includes forming a plurality of transistors on a substrate, each transistor of the plurality of transistors including a nanowire channel region, doping the nanowire channel region of each transistor of the plurality of transistors, grouping the plurality of transistors into a plurality of transistor groups each including two transistors of the plurality of transistors, measuring an electrical characteristic of each transistor of each transistor group, determining a state for each transistor group based on the measured electrical characteristic of each transistor in each transistor group, and generating a security code for the plurality of transistors by grouping together the states corresponding to each transistor group.

According to an exemplary embodiment of the present invention, a semiconductor device includes a plurality of transistors on a substrate, each transistor of the plurality of transistors including a doped nanowire channel region, where the plurality of transistors are grouped into a plurality of transistor groups each including two transistors of the plurality of transistors, and where each transistor group is assigned a state based on an electrical characteristic of each transistor in each transistor group. The semiconductor device includes a security code for the plurality of transistors generated by grouping together the states corresponding to each transistor group.

According to an exemplary embodiment of the present invention, a computer program product for generating a security code for a semiconductor device includes a computer readable storage medium having program instructions embodied therewith, the program instructions executable by one or more processors to cause the one or more processors to perform a method including grouping a plurality of transistors formed on a substrate into a plurality of transistor groups each including two transistors of the plurality of transistors, measuring an electrical characteristic of each transistor of each transistor group, determining a state for each transistor group based on the measured electrical characteristic of each transistor in each transistor group, and generating a security code for the plurality of transistors by grouping together the states corresponding to each transistor group, where each transistor of the plurality of transistors includes a doped nanowire channel region.

Determining the state may include comparing the measured electrical characteristic of each transistor in each transistor group to determine an electrical characteristic match or mismatch between transistors in each transistor group. The electrical characteristic can be, for example, threshold voltage, on-current or off-current. Determining the state may include concluding whether a measured threshold voltage of each transistor in each transistor group corresponds to a high threshold voltage or a low threshold voltage. The threshold voltage of each transistor can be based on an integer number of dopants in the channel region of each transistor.

The plurality of transistor groups can each include two transistors of the plurality of transistors, where the channel region of each transistor is a portion of a nanowire.

Each transistor of the plurality of transistors may include a plurality of channel regions in a stacked configuration, and some of the plurality of channel regions in the stacked configuration of each transistor may be removed to leave at least one channel region of the plurality of channel regions in each transistor to be doped.

Another plurality of transistors can be formed on the substrate, where each transistor of the other plurality of transistors includes an undoped channel region.

Advantageously, embodiments of the present invention provide on-chip hardware based security, where the security code on each chip is unique and difficult to replicate because the code is generated by quantized dopants. In accordance with an embodiment of the present invention, the analog security code is based on electrical characteristics of paired nanowire transistors or other combinations of nanowire transistors having doped channel regions.

These and other exemplary embodiments of the invention will be described in or become apparent from the following detailed description of exemplary embodiments, which is to be read in connection with the accompanying drawings.

BRIEF DESCRIPTION OF THE DRAWINGS

Exemplary embodiments of the present invention will be described below in more detail, with reference to the accompanying drawings, of which.

DETAILED DESCRIPTION

Figure 1A:
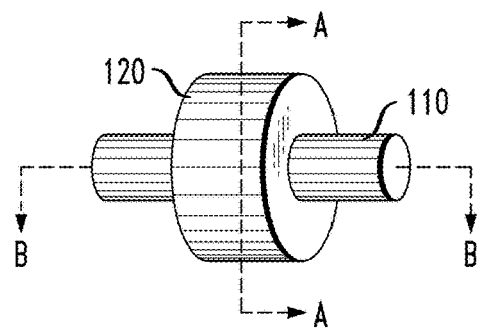
FIG. 1A is a three-dimensional view illustrating a nanowire and gate of a semiconductor device, according to an exemplary embodiment of the present invention.

Exemplary embodiments of the invention will now be discussed in further detail with regard to semiconductor devices and methods of manufacturing same and, in particular, to providing on-chip security by taking advantage of variations of the number of dopants and the placement of transistor channels on a chip.

It is to be understood that the various layers and/or regions shown in the accompanying drawings are not drawn to scale, and that one or more layers and/or regions of a type commonly used in, for example, complementary metal-oxide semiconductor (CMOS), nanowire field-effect transistor (FET), fin field-effect transistor (FinFET), metal-oxide-semiconductor field-effect transistor (MOSFET) and/or other semiconductor devices may not be explicitly shown in a given drawing. This does not imply that the layers and/or regions not explicitly shown are omitted from the actual devices. In addition, certain elements may be left out of particular views for the sake of clarity and/or simplicity when explanations are not necessarily focused on the omitted elements. Moreover, the same or similar reference numbers used throughout the drawings are used to denote the same or similar features, elements, or structures, and thus, a detailed explanation of the same or similar features, elements, or structures will not be repeated for each of the drawings.

The semiconductor devices and methods for forming same in accordance with embodiments of the present invention can be employed in applications, hardware, and/or electronic systems. Suitable hardware and systems for implementing embodiments of the invention may include, but are not limited to, personal computers, communication networks, electronic commerce systems, portable communications devices (e.g., cell and smart phones), solid-state media storage devices, functional circuitry, etc. Systems and hardware incorporating the semiconductor devices are contemplated embodiments of the invention. Given the teachings of embodiments of the invention provided herein, one of ordinary skill in the art will be able to contemplate other implementations and applications of embodiments of the invention.

The embodiments of the present invention can be used in connection with semiconductor devices that may require, for example, nanowire FETs, nanosheet FETs, CMOSs, MOSFETs and/or FinFETs. By way of non-limiting example, the semiconductor devices can include, but are not limited to nanowire FET, nanosheet FETs, CMOS, MOSFET and FinFET devices, and/or semiconductor devices that use CMOS, MOSFET and/or FinFET technology.

As used herein, "height" refers to a vertical size of an element (e.g., a layer, trench, hole, opening, etc.) in the three-dimensional and/or cross-sectional views measured from a bottom surface to a top surface of the element, and/or measured with respect to a surface on which the element is located. Conversely, a "depth" refers to a vertical size of an element (e.g., a layer, trench, hole, opening, etc.) in the three-dimensional views measured from a top surface to a bottom surface of the element.

As used herein, "lateral," "lateral side," "lateral surface" refers to a side surface of an element (e.g., a layer, opening, etc.), such as a left or right side surface in the drawings.

As used herein, "width" or "length" refers to a size of an element (e.g., a layer, trench, hole, opening, etc.) in the drawings measured from a side surface to an opposite surface of the element.

As used herein, terms such as "upper", "lower", "right", "left", "vertical", "horizontal", "top", "bottom", and derivatives thereof shall relate to the disclosed structures and methods, as oriented in the drawing figures. For example, as used herein, "vertical" refers to a direction perpendicular to the top surface of the substrate in the three-dimensional and/or cross-sectional views, and "horizontal" refers to a direction parallel to the top surface of the substrate in the three-dimensional and/or cross-sectional views.

As used herein, unless otherwise specified, terms such as "on", "overlying", "atop", "on top", "positioned on" or "positioned atop" mean that a first element is present on a second element, wherein intervening elements may be present between the first element and the second element. As used herein, unless otherwise specified, the term "directly" used in connection with the terms on", "overlying", "atop", "on top", "positioned on" or "positioned atop" or the term "direct contact" mean that a first element and a second element are connected without any intervening elements, such as, for example, intermediary conducting, insulating or semiconductor layers, present between the first element and the second element.

Scaling and other considerations have led to the development of nanowires. A nanowire is a relatively thin wire, for example, with a diameter or width measured in nanometers (nm). Nanowires can have diameters or widths such as, for example, about 4 nm to 10 nm. Nanowire devices can be a viable device option instead of fin field-effect transistors (FinFETs). For example, a nanowire can be used as the fin structure in a dual-gate, tri-gate, omega-gate, or gate-all-around (GAA) FET device. Complementary metal-oxide semiconductor (CMOS) scaling can be enabled by the use of stacked nanowires, which can offer superior electrostatics and higher current density per footprint area than FinFETs.

Embodiments of the present invention provide a method and structure for forming semiconductor devices that provide on-chip security by taking advantage of the quantization nature in nanowire transistors. Embodiments take advantage of the inherent variation of number of dopants and the placement of nanowire transistor channels on a chip. For example, in accordance with an embodiment of the present invention, channel doping of an array of paired nanowire transistors is intentionally performed to introduce a security code, while also forming nanowire CMOSs with undoped channels. In accordance with an embodiment of the present invention, resulting threshold voltages ($V_t$) of the paired transistors, including threshold voltage mismatches, are measured. The paired transistors include the doped channel regions, and the threshold voltages depend on the amount of channel region doping. As a result, an analog type, as opposed to digital security code can be formed based on the measured threshold voltages of each pair and the threshold voltage similarity or variation between each transistor of the pairs. In accordance with an embodiment of the present invention, as an alternative to threshold voltage, other transistor characteristics can also be used to generate security codes. Unlike conventional approaches, other transistor characteristics that can be used to generate security codes include, for example, measuring on-current (electrical current flowing through the doped channel of a transistor when it is turned on), and measuring off-current (electrical leakage current when a transistor with a doped channel region is off).

Unlike known approaches, as explained further herein, embodiments of the present invention provide the advantage of using paired nanowire FETs to generate a 2-bit security code, such as (0,0), (0,1), (1,0), or (1,1) corresponding to threshold voltages of paired transistors. Aspects of the present invention provide chip security at the transistor level, which is more attractive and much more difficult to decode than software based security. Furthermore, the embodiments of the present invention, which rely on the inherent variation of the number of dopants and the placement of nanowire transistor channels on a chip, are less prone to malicious attack, and easier to implement than known solutions.

While embodiments of the present invention are discussed in terms of pairs of transistors, which have the advantage of providing 2-bit security codes, the embodiments are not necessarily limited thereto. For example, chip security codes, in accordance with embodiments of the present invention, may be based on larger groupings than pairs of transistors, such as, for example, groups of three, four or more transistors.

Embodiments of the present invention utilize, for example, MOSFET transistor characteristics, such as threshold voltage, which is dependent on channel doping. For small size nanowire transistors, the number of dopants in a channel may vary significantly. In an illustrative example, for a nanowire with diameter=8 nm, and gate length=15 nm, $2E18/cm^3$ channel doping yields 1.5 dopants (Doping×$V_{cyl}$=Doping×$\pi r^2 h$=$2E18/cm^3$×3.14×$(4\ nm)^2$×15 nm). However, the number of dopants in each nanowire channel has to be an integer, meaning some channels, for example, may have only 1 dopant, and other channels may have 2 dopants.

For example, a first nanowire having the above dimensions with 1 channel dopant (also referred to herein as "1 dopant") will have an effective dopant concentration of $1.3E18/cm^3$. In contrast, a second nanowire having the above dimensions with 2 channel dopants (also referred to herein as "2 dopants") will have an effective dopant concentration of $2.6E18/cm^3$, which is twice the effective dopant concentration of the first nanowire, resulting in a large threshold voltage variation, as explained further herein. The effective dopant concentration corresponding to, for example, 1 or 2 dopants will vary with changes in dimensions of a nanowire.

Figure 1B:
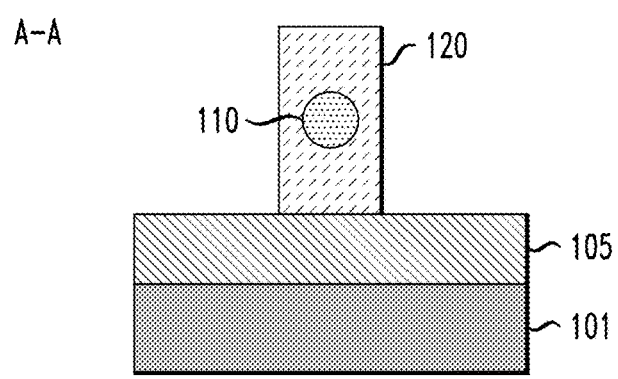
FIG. 1B is a cross-sectional view taken along line A-A of FIG. 1A, according to an exemplary embodiment of the present invention.
Figure 1C:
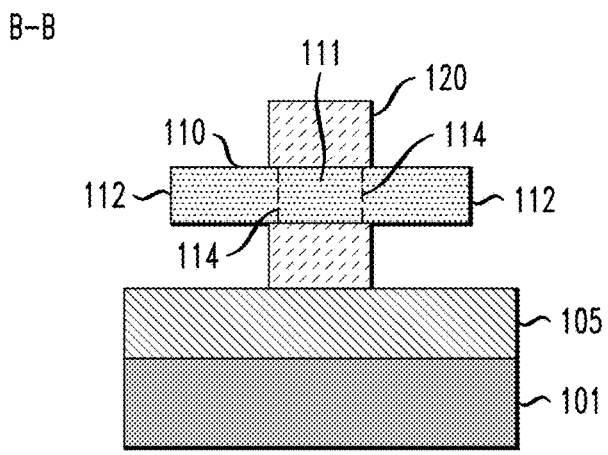
FIG. 1C is a cross-sectional view taken along line B-B of FIG. 1A, according to an exemplary embodiment of the present invention.

FIG. 1A is a three-dimensional view illustrating a nanowire and gate of a semiconductor device, according to an exemplary embodiment of the present invention. The three-dimensional view of FIG. 1A illustrates a gate extension direction substantially into the page, and a nanowire extension direction in substantially left and right directions on the page. FIGS. 1B and 1C are cross-sectional views respectively taken along lines A-A and B-B of FIG. 1A, according to an exemplary embodiment of the present invention.

Referring to FIGS. 1A-1C, a semiconductor substrate 101 includes semiconductor material including, but not limited to, silicon (Si), silicon germanium (SiGe), silicon carbide (SiC), silicon germanium carbide (SiGeC), II-V compound semiconductor or other like semiconductor. In addition, multiple layers of the semiconductor materials can be used as the semiconductor material of the substrate. In accordance with an embodiment of the present invention, a buried insulating layer 105, such as, for example, a buried oxide or nitride layer is located on an upper surface of the semiconductor substrate 101.

A gate-all-around (GAA) nanowire structure including a nanowire 110 and a gate 120 formed around the nanowire 110 is formed on the buried insulating layer 105. Referring to FIG. 1C, the nanowire 110 can include source/drain regions 112 on ends thereof separated by a channel region 111 between the source/drain regions 112. Junctions 114 are formed between source/drain regions 112 and the channel region 111. The gate 120 wraps around the channel region 111. In a conventional arrangement, source/drain regions 112 are heavily doped, while the channel region 111 remains undoped. Source/drain regions 112 can be thickened, for example, by epitaxy, to reduce the external resistance of the transistor. Spacers (not shown), including dielectric material, may be formed on gate sidewalls. Isolation regions (not shown), serving to electrically isolate adjacent transistors when needed, may be formed.

The nanowire 110 can be formed by known methods of manufacturing GAA nanowire structures, including, for example, epitaxial growth or deposition, and patterning of nanowires, which can be formed from materials including, but not limited to, silicon (Si), silicon germanium (SiGe), and carbon nanotube. In some embodiments, nanowires are formed, for example, by forming alternating Si/SiGe layers, patterning Si/SiGe layers into patterned stacks. SiGe layers are then selectively removed with respect to one or more Si layers in a nanosheet stack or vice versa to form suspended nanowires. Gates are then formed around the nanowires by any suitable techniques such as deposition and patterning processes. A gate may include a gate dielectric and gate conductor. Gates can be formed by gate-first flow or a replacement metal (RMG) process.

Gate dielectrics can include silicon oxide, silicon nitride, silicon oxynitride, boron nitride, high-k materials, or any combination of these materials. Examples of high-k materials include, but are not limited to, metal oxides such as hafnium oxide, hafnium silicon oxide, hafnium silicon oxynitride, lanthanum oxide, lanthanum aluminum oxide, zirconium oxide, zirconium silicon oxide, zirconium silicon oxynitride, tantalum oxide, titanium oxide, barium strontium titanium oxide, barium titanium oxide, strontium titanium oxide, yttrium oxide, aluminum oxide, lead scandium tantalum oxide, and lead zinc niobate. The high-k gate dielectric material may further include dopants such as lanthanum, aluminum. In one embodiment of the invention, the conformal layer of gate dielectric material is formed with a thickness in a range of about 0.5 nm to about 2.5 nm, which will vary depending on the target application. The conformal layer of gate dielectric material is deposited using known methods such as atomic layer deposition (ALD), for example, which allows for high conformality of the gate dielectric material.

Gate conductors include, but are not necessarily limited to, doped polycrystalline or amorphous silicon, germanium, silicon germanium, a metal (e.g., tungsten, titanium, tantalum, ruthenium, zirconium, cobalt, copper, aluminum, lead, platinum, tin, silver, gold), a conducting metallic compound material (e.g., tantalum nitride, titanium nitride, tantalum carbide, titanium carbide, titanium aluminum carbide, tungsten silicide, tungsten nitride, ruthenium oxide, cobalt silicide, nickel silicide), carbon nanotube, conductive carbon, graphene, or any suitable combination of such conductive materials. The layer of conductive material may further include dopants that are incorporated during or after deposition. The layer of conductive material is deposited using a suitable deposition process, for example, chemical vapor deposition (CVD), plasma-enhanced CVD (PECVD), physical vapor deposition (PVD), plating, thermal or e-beam evaporation, sputtering, etc.

In some embodiments, a gate further includes a work function metal (WFM) between the gate dielectric and gate conductor. WFM may be deposited over the conformal layer of gate dielectric material prior to depositing the layer of gate conductive material. The thin conformal WFM layer can be formed of one or more types of metallic materials, including, but not limited to, TiN, TaN, TiAlC, Zr, W, Hf, Ti, Al, Ru, Pa, TiAl, ZrAl, WAl, TaAl, HfAl, TiAlC, TaC, TiC, TaMgC, or other work function metals or alloys that are commonly used to obtain target work functions which are suitable for the type (e.g., n-type or p-type) of FET devices that are to be formed. The conformal WFM layer is deposited using known methods such as atomic layer deposition (ALD), CVD, etc. In one embodiment, the conformal WFM layer is formed with a thickness in a range of about 2 nm to about 5 nm. In some embodiments, the conductive material that forms the gate conductor can serve as a WFM layer.

Although embodiments of the present invention are discussed in terms of GAA nanowire structures, the embodiments of the present invention are not necessarily limited thereto, and may be applicable to other structures, such as, but not necessarily limited to, dual-gate, tri-gate omega-gate, or GAA FinFETs.

Figure 2:
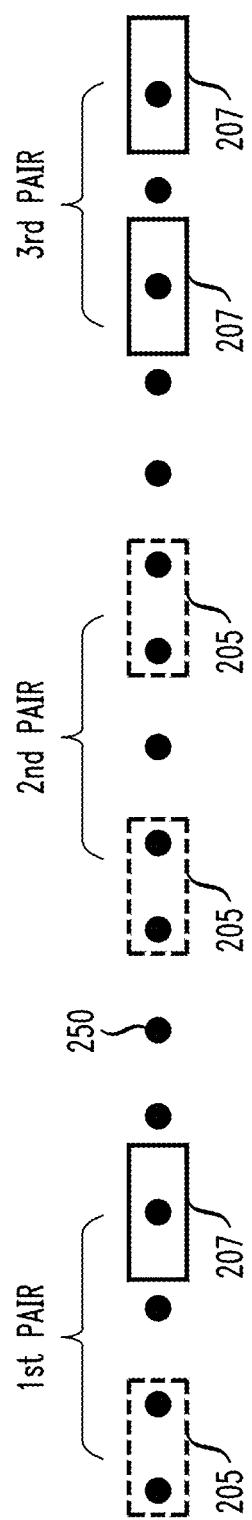
FIG. 2 is a conceptual view of pairs of transistors having different or the same threshold voltages, according to an exemplary embodiment of the present invention.

FIG. 2 is a conceptual view of pairs of transistors having different or the same threshold voltages, according to an exemplary embodiment of the present invention. Each dot 250 represents a dopant, and each box 205, 207 represents a channel region of a transistor. As shown in FIG. 2, the boxes with the dotted lines 205 include 2 dopants, while the boxes with the solid lines 207 include 1 dopant, resulting in a 100% variation (1 to 2) in the effective dopant concentration between channel regions of transistors with 1 dopant and channel regions of transistors with 2 dopants. The 100% variation in effective dopant concentration causes a relatively large threshold voltage ($V_t$) variation. For example, a "high $V_t$" can correspond to 2 dopants and a "low $V_t$" can correspond to 1 dopant. Transistor $V_t$ can range from 150 mV to 500 mV, depending on transistor structures, such as nanowire diameter, gate length, the thickness and dielectric constant of a gate dielectric, gate work-function, and channel doping concentrations, etc. As an example, for 6 nm nanowire diameter, gate length of 25 nm, and an equivalent gate oxide thickness of 1.4 nm, a change of doping concentration of 1.3e18 cm$^{-3}$ results in about 10 mV $V_t$ change. According to an embodiment of the present invention, if $V_t$ difference is less than 5 mV, it can be concluded that those two threshold voltages match. If $V_t$ difference is greater than 5 mV, it can be concluded that those two threshold voltages do not match, and the higher $V_t$ can be determined to be a "high $V_t$", while the lower $V_t$ can be determined to be a "low $V_t$." Alternatively, in an embodiment of the present invention, if on-current is measured, matching is concluded when the difference is less than 2% of average on-current, and if off-current is measured, matching is concluded when the difference is less than 50% of average off-current.

Variation between low and high $V_t$ is not necessarily limited to a 100% variation in effective dopant concentration, and can occur at more or less than a 100% variation in effective dopant concentration, such as 20% (e.g., 5 to 6 dopants), 50% (e.g., 2 to 3 dopants), 200% (e.g., 1 to 3 dopants), 300% (e.g., 1 to 4 dopants) variation, etc.

Referring to FIG. 2, the 1$^{st}$ pair of transistors have different threshold voltages from each other (1 high $V_t$ and 1 low $V_t$) based on a channel 205 of a first transistor with 2 dopants 250 and a channel 207 of a second transistor with 1 dopant 250. The 2$^{nd}$ pair of transistors have the same or substantially the same threshold voltage. In the 2$^{nd}$ pair, both transistors have high $V_t$ based on a channel 205 of a first transistor with 2 dopants 250 and a channel 205 of a second transistor also with 2 dopants 250. The 3$^{rd}$ pair of transistors have the same or substantially the same threshold voltage. In the 3$^{rd}$ pair, both transistors have low $V_t$ based on a channel 207 of a first transistor with 1 dopant 250 and a channel 207 of a second transistor also with 1 dopant 250.

The 1$^{st}$ pair of transistors in FIG. 2 (1 high $V_t$ and 1 low $V_t$) can be represented as a 1$^{st}$ 2-bit state ("1, 0"). The 2$^{nd}$ pair of transistors in FIG. 2 (both high $V_t$) can be represented as a 2$^{nd}$ 2-bit state ("1, 1"). The 3$^{rd}$ pair of transistors in FIG. 2 (both low $V_t$) can be represented as a 3$^{rd}$ 2-bit state ("0, 0"). In accordance with an embodiment of the present invention, grouping all of the states together of an array of transistor pairs (e.g., (1, 0), (1, 1) and (0, 0) on a chip forms a security code that is unique and random to each chip. The threshold voltage of each transistor of each pair is measured to determine the unique security code of the chip. Depending on applications, in accordance with embodiments of the present invention, the security codes may have, in non-limiting cases, 128 total bits to 2048 total bits, translating to 64 to 1024 transistor pairs.

In accordance with an embodiment of the present invention, using threshold voltage ($V_t$) as an example, the code assignment (i.e., 0 or 1) for each pair of transistors can be performed as follows. The threshold voltages for each transistor in a pair of transistors is determined. Then, it is determined whether the threshold voltages of the pair match. If the threshold voltages do not match (meaning $V_t$ difference is greater than a predetermined value, for example, 5 mV), then a logic "1" is assigned to the higher $V_t$ transistor and a logic "0" is assigned to the lower $V_t$ transistor. If the threshold voltages match, the average of threshold voltage of the pair of transistors is calculated. If the average threshold voltage of the pair of transistors is above the average threshold voltage of all the security transistors, then a "1, 1" state is assigned to the pair. If the average threshold voltage of the pair of transistors is below the average threshold voltage of all the security transistors, then a "0, 0" state is assigned to the pair.

Similar methodology for code assignment can also be performed in the case of on-current and off-current, where the on- or off-currents for each transistor in a pair of transistors is determined. Then, it is determined whether the on- or off-currents of the pair match. If the on- or off-currents do not match, then a logic "1" is assigned to the transistor with the higher on- or off-current and a logic "0" is assigned to the transistor with the lower on- or off-current. If the on- or off-currents match, the average of on- or off-currents of the pair of transistors is calculated. If the average on- or off-current of the pair of transistors is above the average on- or off-current of all the security transistors, then a "1, 1" state is assigned to the pair. If the average on- or off-current of the pair of transistors is below the average on- or off-current of all the security transistors, then a "0, 0" state is assigned to the pair.

Figure 3:
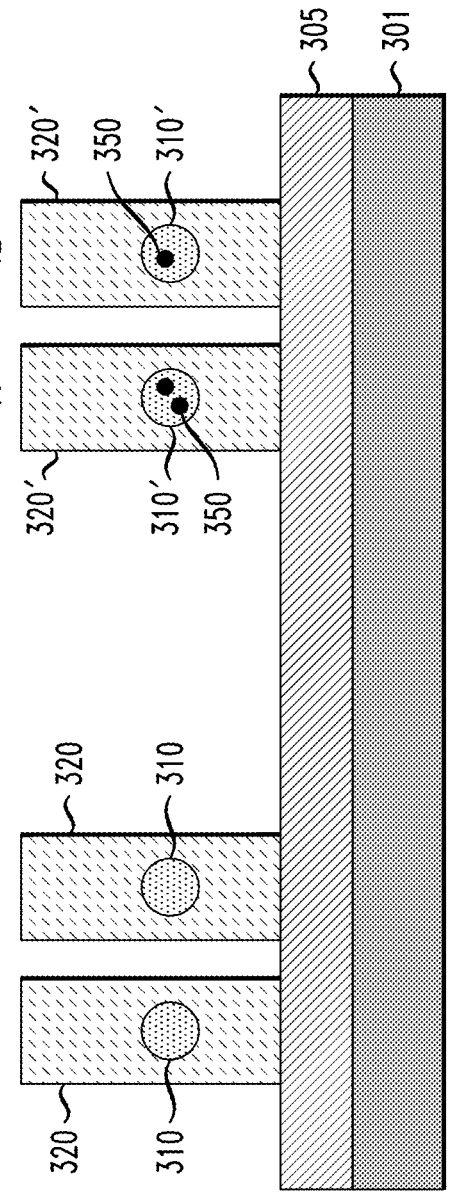
FIG. 3 is a cross-sectional view illustrating a security nanowire pair in a semiconductor device, according to an exemplary embodiment of the present invention.

According to an embodiment, the dopants 250 in FIG. 2 are uniformly distributed. However, the embodiments of the present invention are not necessarily limited to uniformly distributed dopants, and the dopant distribution itself may have variations. Referring to FIG. 2, the number of dopants corresponding to a channel region depends on where a channel region is formed. For example, referring to FIG. 3, nanowires, such as a nanowires 310' on a substrate 301 including a buried oxide layer 305, include a dopant that has been uniformly distributed along a length of the nanowires 310'. Depending on where the gates 320' and corresponding channel regions are located on the nanowire, the channel regions of the corresponding transistors may have the same or different number of dopants 350. For example, as shown in FIG. 3, which is a cross-sectional view illustrating a security nanowire pair in a semiconductor device, according to an exemplary embodiment of the present invention, a security nanowire pair includes two transistors T1 and T2 respectively including 2 dopants 350 and 1 dopant 350 corresponding to nanowires 310' of each transistor. Accordingly, the state of the T1, T2 transistor pair may be defined as 1, 0, based on a high $V_t$ for transistor T1 and a low $V_t$ of transistor T2. It is to be understood that the threshold voltages of transistors of multiple transistor pairs included on a chip is measured to determine the states of each pair, and the resulting security code for the chip being a grouping of the states of each pair. According to an embodiment, the security code can be a representation of the state of each transistor pair, or other larger combination of transistors.

Threshold voltage is measured electrically. Threshold voltage can be measured by ramping up gate voltage, while measuring the channel current. $V_t$ is then determined as the gate voltage which results in a pre-fixed channel current.

Referring to FIG. 3, the chip further includes CMOS device nanowires 310 surrounded by gates 320 which maintain undoped channel regions to avoid random dopant fluctuation due to there being no dopants, and, accordingly, no dopant concentration variation (fluctuation). The security nanowires 310' are intentionally doped to introduce the security code. Doping can be performed using processes, such as, for example, ion implantation, gas phase doping, plasma doping, plasma immersion ion implantation, cluster doping, infusion doping, liquid phase doping, solid phase doping, etc., and dopants may include, for example, an n-type dopant selected from a group of phosphorus (P), arsenic (As) and antimony (Sb), and a p-type dopant selected from a group of boron (B), boron fluoride ($BF_2$), gallium (Ga), indium (In), and thallium (Tl) at various concentrations depending on dimensions of the nanowires to result in an integer number of dopants in nanowire channels. For example, in a non-limiting example, a dopant concentration range may be $1e19/cm^3$ to $1e19/cm^3$.

In some embodiments, security nanowire doping can be done by ion implantation with a mask open at the security nanowire regions so that dopants can get into security nanowires while blocking other regions (e.g., non-security regions). The masked doping can be done at any suitable process steps, e.g., before nanowire patterning, after nanowire patterning, before gate formation, after gate formation, etc. According to an embodiment, security nanowire doping does not occur at the same time source/drain doping occurs since source/drain doping concentration is typically much higher than the channel doping concentration.

Figure 4:
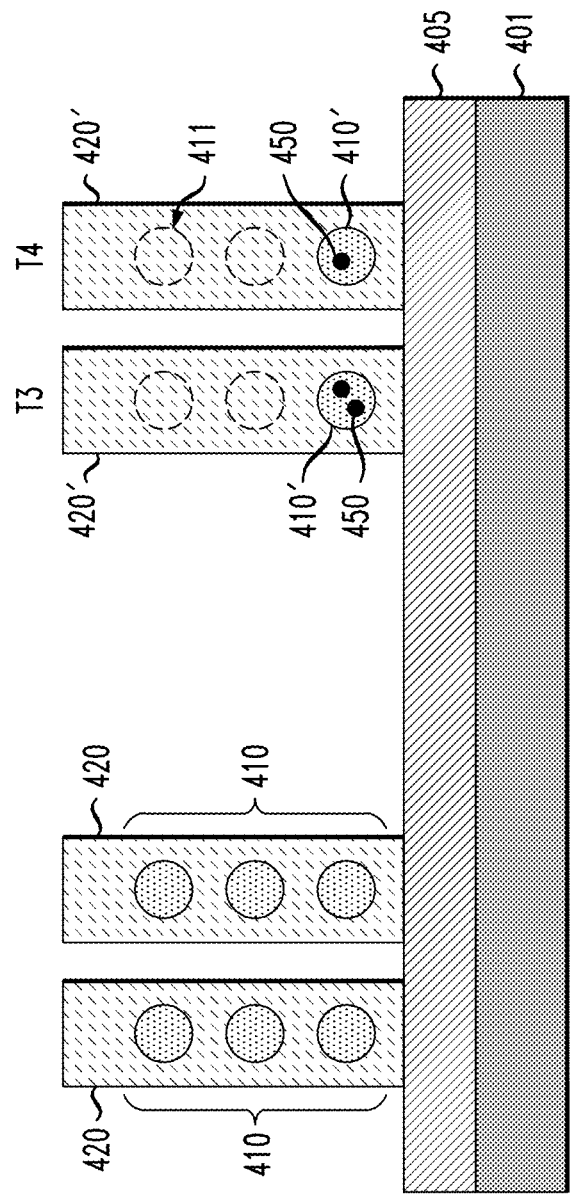
FIG. 4 is a cross-sectional view illustrating a security nanowire pair in a semiconductor device, according to an exemplary embodiment of the present invention.

FIG. 4 is a cross-sectional view illustrating a security nanowire pair in a semiconductor device, according to an exemplary embodiment of the present invention. Referring to FIG. 4, stacked nanowires 410 are formed on a substrate 401 including a buried insulating layer 405. The stacked nanowires are surrounded by gates 420. Stacked nanowires can increase drive current for a given chip area of CMOS devices. In accordance with an embodiment of the present invention, in order to integrate the security nanowires on a device including stacked nanowires, patterning, including for example, applying a mask to cover a CMOS device region and open a security region can be performed. In accordance with an embodiment of the present invention, using any suitable etch process to remove all nanowires except the bottom nanowire can be performed to remove most nanowires in a security nanowire stack and to leave, for example, 1 nanowire 410' in each of transistors T3 and T4 in FIG. 4 of a security transistor pair. The removed nanowires are shown by dotted circular shapes 411. In a replacement gate flow, nanowire removal can be done after removing a dummy gate and prior to the deposition of the gate dielectric. Channel doping can be done at this point as well, with the same mask in place.

The remaining nanowires 410' include a dopant that has been uniformly distributed along a length of the nanowires 410'. As noted above, dopant distribution may or may not necessarily be uniform due to variations in doping processes. Non-uniform doping distribution may enhance the variation of channel doping in security nanowire transistors. Depending on where the gates 420' and corresponding channel regions are located on the nanowire, the channel regions of the corresponding transistors may have the same or different number of dopants 450. For example, as shown in FIG. 4, a security nanowire pair includes two transistors T3 and T4 respectively including 2 dopants 450 and 1 dopant 450 corresponding to nanowires 410' in a channel region of each transistor. Accordingly, the state of the T3, T4 transistor pair may be defined as 1, 0, based on a high $V_t$ for transistor T3 and a low $V_t$ of transistor T4. It is to be understood that the threshold voltages of transistors of multiple transistor pairs included on a chip is measured to determine the states of each pair, and the resulting security code for the chip being a grouping of the states of each pair. According to an embodiment, the security code can be a representation of the state of each transistor pair, or other larger combination of transistors.

Referring to FIG. 4, one or more CMOS device stacked nanowires 410 surrounded by gates 420 remain undoped. The security nanowires 410' are intentionally doped to introduce the security code. According to an embodiment, the same mask can be used for doping and nanowire removal in a security area.

Figure 5:
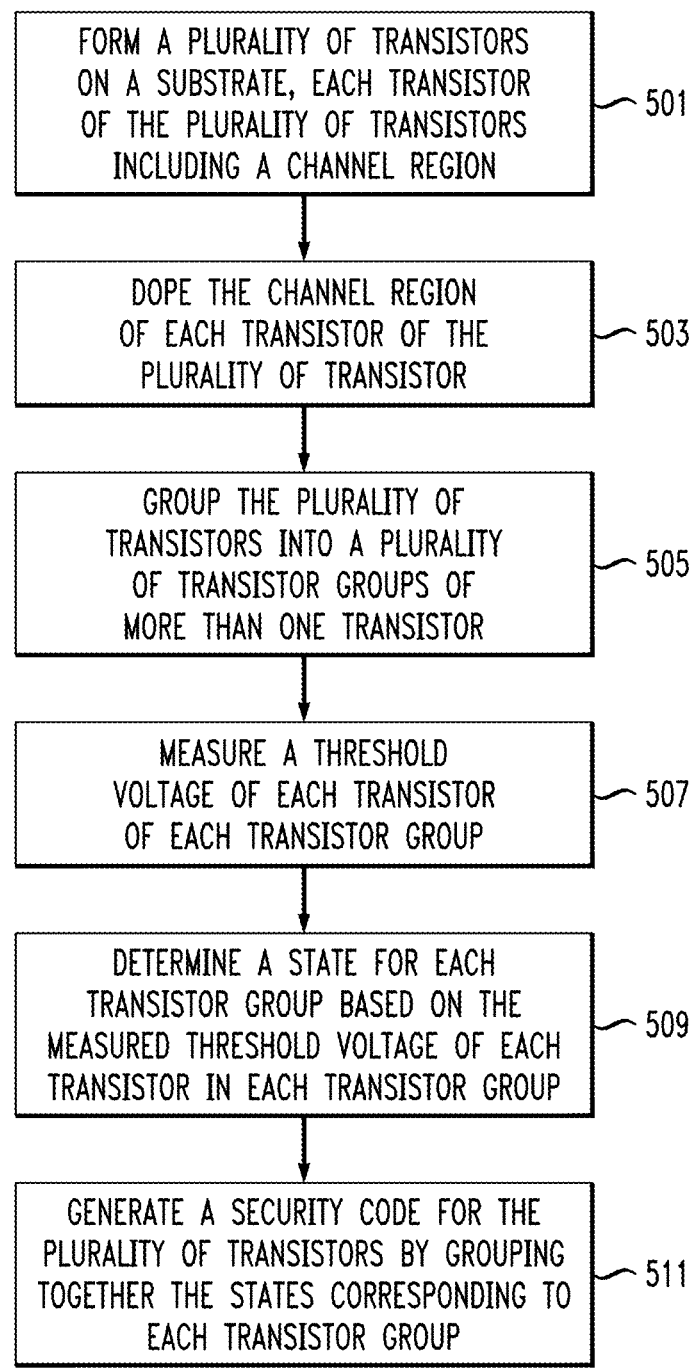
FIG. 5 is a flow diagram of a process for manufacturing a semiconductor device, according to an exemplary embodiment of the invention.

FIG. 5 is a flow diagram of a process for manufacturing a semiconductor device, according to an exemplary embodiment of the invention. Referring to FIG. 5, the process 500 includes, at blocks 501 and 503, forming a plurality of transistors on a substrate, wherein each transistor of the plurality of transistors includes a channel region, and doping the channel region of each transistor of the plurality of transistors. According to an embodiment, the channel region of each transistor is a portion of a nanowire surrounded, at least in part, by a gate.

Referring to block 505, the plurality of transistors are grouped into a plurality of transistor groups of more than one transistor. According to an embodiment, the plurality of transistor groups each include two (e.g., a pair of) transistors of the plurality of transistors to advantageously result in a 2-bit security code. Another option may include transistor groups having more than two transistors in the group to result in greater than 2-bit security codes.

At block 507, a threshold voltage of each transistor of each transistor group is measured, and at block 509, a state for each transistor group is determined based on the measured threshold voltage of each transistor in each transistor group. Determining the state can include comparing the measured threshold voltage of each transistor in each transistor group to determine a threshold voltage match or mismatch between transistors in each transistor group, and concluding whether the measured threshold voltage of each transistor in each transistor group corresponds to a high threshold voltage or a low threshold voltage. The threshold voltage of each transistor is based on an integer number of dopants in the channel region of each transistor. Referring to block 511, a security code for the plurality of transistors is generated by grouping together the states corresponding to each transistor group. As noted above, while using $V_t$ is one way to form a security code, embodiments of the present invention also contemplate using other transistor characteristics such as measuring on-current or off-current corresponding to transistors with doped channel regions to form security codes.

Embodiments of the present invention provide on-chip hardware based security, where the security code on each chip is unique and difficult to replicate because the code is generated by quantized dopants. In accordance with an embodiment of the present invention, the analog security code is based on paired nanowire transistors or other combinations of nanowire transistors.

Embodiments of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

We claim:

1. A method for generating a security code for a semiconductor device, comprising:
    forming a plurality of transistors on a substrate, each transistor of the plurality of transistors including a channel region;
    wherein the channel region of each transistor is a portion of a nanowire; and
    wherein the portion of the nanowire is surrounded by a gate;
    doping the channel region of each transistor of the plurality of transistors, wherein the doping is performed with a given dopant at a given concentration;
    grouping the plurality of transistors into a plurality of transistor groups of more than one transistor;
    measuring a threshold voltage of each transistor of each transistor group;
    determining a state for each transistor group based on the measured threshold voltage of each transistor in each transistor group, wherein each state comprises a plurality of bits;
    generating the security code for the plurality of transistors by grouping together the states corresponding to each transistor group;
    wherein an effective dopant concentration of two or more of the channel regions differs based on locations of the two or more of the channel regions;
    wherein the different effective dopant concentrations of the two or more of the channel regions are represented by different bits of the plurality of bits in the security code; and
    concluding whether the measured threshold voltage of each transistor in each transistor group corresponds to a high threshold voltage or a low threshold voltage;
    wherein each high threshold voltage is represented by a first bit in the security code designating a high logic value, and each low threshold voltage is represented by a second bit in the security code different from the first bit and designating a low logic value.

2. The method according to claim 1, wherein determining the state comprises comparing the measured threshold voltage of each transistor in each transistor group to determine a threshold voltage match or mismatch between transistors in each transistor group.

3. The method according to claim 1, wherein the plurality of transistor groups each comprise two transistors of the plurality of transistors.

4. The method according to claim 1, wherein the threshold voltage of each transistor is based on an integer number of dopants in the channel region of each transistor.

5. The method according to claim 1, further comprising forming another plurality of transistors on the substrate, each transistor of the other plurality of transistors including an undoped channel region.

6. The method according to claim 1, further comprising forming another plurality of transistors on the substrate, each transistor of the other plurality of transistors including a plurality of undoped channel regions in a stacked configuration.

7. The method according to claim 1, wherein each transistor of the plurality of transistors includes a plurality of channel regions in a stacked configuration, the method further comprising removing some of the plurality of channel regions in the stacked configuration of each transistor to leave at least one channel region of the plurality of channel regions in each transistor to be doped in the doping step.

8. A semiconductor device, comprising:
    a plurality of transistors on a substrate, each transistor of the plurality of transistors including a doped channel region;
    wherein the doped channel region of each transistor is a portion of a nanowire; and
    wherein the portion of the nanowire is surrounded by a gate;

wherein the plurality of transistors are grouped into a plurality of transistor groups of more than one transistor;
wherein each transistor group is assigned a state based on a threshold voltage of each transistor in each transistor group;
wherein each state comprises a plurality of bits; and
a security code for the plurality of transistors generated by grouping together the states corresponding to each transistor group;
wherein an effective dopant concentration of two or more of the doped channel regions differs based on locations of the two or more of the doped channel regions;
wherein the different effective dopant concentrations of the two or more of the doped channel regions are represented by different bits of the plurality of bits in the security code;
wherein each state is based on whether the threshold voltage of each transistor in each transistor group corresponds to a high threshold voltage or a low threshold voltage; and
wherein each high threshold voltage is represented by a first bit in the security code designating a high logic value, and each low threshold voltage is represented by a second bit in the security code different from the first bit and designating a low logic value.

9. The semiconductor device according to claim 8, wherein the plurality of transistor groups each comprise two transistors of the plurality of transistors.

10. The semiconductor device according to claim 8, wherein the threshold voltage of each transistor is based on an integer number of dopants in the doped channel region of each transistor.

11. The semiconductor device according to claim 8, further comprising another plurality of transistors on the substrate, each transistor of the other plurality of transistors including an undoped channel region.

12. A method for generating a security code for a semiconductor device, comprising:
forming a plurality of transistors on a substrate, each transistor of the plurality of transistors including a nanowire channel region;
wherein the nanowire channel region is surrounded by a gate;
doping the nanowire channel region of each transistor of the plurality of transistors;
wherein the doping is performed with a given dopant at a given concentration;
grouping the plurality of transistors into a plurality of transistor groups each including two transistors of the plurality of transistors;
measuring an electrical characteristic of each transistor of each transistor group;
determining a state for each transistor group based on the measured electrical characteristic of each transistor in each transistor group, wherein each state comprises a plurality of bits;
generating the security code for the plurality of transistors by grouping together the states corresponding to each transistor group;
wherein an effective dopant concentration of two or more of the nanowire channel regions differs based on locations of the two or more of the nanowire channel regions;
wherein the different effective dopant concentrations of the two or more of the nanowire channel regions are represented by different bits of the plurality of bits in the security code; and
concluding whether the measured electrical characteristic of each transistor in each transistor group corresponds to a high electrical characteristic or a low electrical characteristic;
wherein each high electrical characteristic is represented by a first bit in the security code designating a high logic value, and each low electrical characteristic is represented by a second bit in the security code different from the first bit and designating a low logic value.

13. The method according to claim 12, wherein determining the state comprises comparing the measured electrical characteristic of each transistor in each transistor group to determine an electrical characteristic match or mismatch between the two transistors in each transistor group.

14. The method according to claim 12, wherein the electrical characteristic comprises a threshold voltage and determining the state comprises concluding whether the measured threshold voltage of each transistor in each transistor group corresponds to a high threshold voltage or a low threshold voltage.

15. The method according to claim 12, wherein the electrical characteristic is selected from the group consisting of a threshold voltage, an on-current and an off-current.

16. A semiconductor device, comprising:
a plurality of transistors on a substrate, each transistor of the plurality of transistors including a doped nanowire channel region;
wherein the doped nanowire channel region is surrounded by a gate; and
wherein the plurality of transistors are grouped into a plurality of transistor groups each including two transistors of the plurality of transistors;
wherein each transistor group is assigned a state based on an electrical characteristic of each transistor in each transistor group;
wherein each state comprises a plurality of bits; and
a security code for the plurality of transistors generated by grouping together the states corresponding to each transistor group;
wherein an effective dopant concentration of two or more of the doped nanowire channel regions differs based on locations of the two or more of the doped nanowire channel regions;
wherein the different effective dopant concentrations of the two or more of the doped nanowire channel regions are represented by different bits of the plurality of bits in the security code;
wherein each state is based on whether the electrical characteristic of each transistor in each transistor group corresponds to a high electrical characteristic or a low electrical characteristic; and
wherein each high electrical characteristic is represented by a first bit in the security code designating a high logic value, and each low electrical characteristic is represented by a second bit in the security code different from the first bit and designating a low logic value.

17. The semiconductor device according to claim 16, wherein the electrical characteristic is selected from the group consisting of a threshold voltage, an on-current and an off-current.

18. The semiconductor device according to claim 16, further comprising another plurality of transistors on the substrate, each transistor of the other plurality of transistors including an undoped channel region.

19. A computer program product for generating a security code for a semiconductor device, the computer program product comprising a computer readable storage medium having program instructions embodied therewith, the program instructions executable by one or more processors to cause the one or more processors to perform a method comprising:

grouping a plurality of transistors formed on a substrate into a plurality of transistor groups each including two transistors of the plurality of transistors;

measuring an electrical characteristic of each transistor of each transistor group;

determining a state for each transistor group based on the measured electrical characteristic of each transistor in each transistor group, wherein each state comprises a plurality of bits;

generating the security code for the plurality of transistors by grouping together the states corresponding to each transistor group;

wherein each transistor of the plurality of transistors includes a doped nanowire channel region;

wherein the doped nanowire channel region is surrounded by a gate;

wherein an effective dopant concentration of two or more of the doped nanowire channel regions differs based on locations of the two or more of the doped nanowire channel regions;

wherein the different effective dopant concentrations of the two or more of the doped nanowire channel regions are represented by different bits of the plurality of bits in the security code; and concluding whether the measured electrical characteristic of each transistor in each transistor group corresponds to a high electrical characteristic or a low electrical characteristic;

wherein each high electrical characteristic is represented by a first bit in the security code designating a high logic value, and each low electrical characteristic is represented by a second bit in the security code different from the first bit and designating a low logic value.

20. The computer program product according to claim 19, wherein determining the state comprises comparing the measured electrical characteristic of each transistor in each transistor group to determine an electrical characteristic match or mismatch between the two transistors in each transistor group.

* * * * *